United States Patent
Roebke et al.

(10) Patent No.: US 9,432,931 B2
(45) Date of Patent: Aug. 30, 2016

(54) METHOD FOR CONTROLLING THE ACTIVITY OF A BASE STATION ENTITY OF A FIRST TYPE IN A MOBILE COMMUNICATION NETWORK

(75) Inventors: Matthias Roebke, Cologne (DE); Markus Breitbach, Bonn (DE)

(73) Assignee: DEUTSCHE TELEKOM AG, Bonn (DE)

(*) Notice: Subject to any disclaimer, the term of this patent is extended or adjusted under 35 U.S.C. 154(b) by 276 days.

(21) Appl. No.: 13/978,392

(22) PCT Filed: Jan. 6, 2012

(86) PCT No.: PCT/EP2012/000047
§ 371 (c)(1),
(2), (4) Date: Sep. 10, 2013

(87) PCT Pub. No.: WO2012/093093
PCT Pub. Date: Jul. 12, 2012

(65) Prior Publication Data
US 2014/0010133 A1  Jan. 9, 2014

Related U.S. Application Data

(60) Provisional application No. 61/430,610, filed on Jan. 7, 2011.

(30) Foreign Application Priority Data

Jan. 7, 2011 (EP) .................................... 11000088

(51) Int. Cl.
H04W 52/02 (2009.01)
H04W 36/00 (2009.01)
H04W 36/14 (2009.01)

(52) U.S. Cl.
CPC ..... *H04W 52/0206* (2013.01); *H04W 36/0066* (2013.01); *H04W 52/0235* (2013.01); *H04W 52/0267* (2013.01); *H04W 36/14* (2013.01); *H04W 52/028* (2013.01)

(58) Field of Classification Search
CPC .................... H04W 52/0235; H04W 52/0206; H04W 36/14; H04W 36/0005; H04W 36/0055; H04W 52/0267
See application file for complete search history.

(56) References Cited

U.S. PATENT DOCUMENTS

2012/0108245 A1* 5/2012 Zhang .................. H04W 28/08 455/443
2012/0329471 A1* 12/2012 Barta ................... H04W 24/02 455/452.1

(Continued)

FOREIGN PATENT DOCUMENTS

EP  2056628 A1  5/2009
EP  2117279 A1  11/2009

(Continued)

OTHER PUBLICATIONS

"Method to increase power efficiency in a mixed GSM/UMTS network"; Mason Publications Hampshire vol. 471, No. 88, Jul. 1, 2003.

(Continued)

*Primary Examiner* — Omer S Mian
(74) *Attorney, Agent, or Firm* — Leyidig, Voit & Mayer, Ltd.

(57) ABSTRACT

A method for controlling the activity of a base station entity of a first type in a mobile communication network is a mobile device having a communication link in a base station entity of a second type includes: sending, by the mobile device, a connection request to the base station entity of the second type, the connection request being related to a request of the mobile device to have a communication link with the base station entity of the first type while the base station entity of the first type is in its second operational mode; and activating the first operational mode of the base station entity of the first type and establishing the communication link between the mobile device and the base station entity of the first type established.

14 Claims, 1 Drawing Sheet

(56) References Cited

U.S. PATENT DOCUMENTS

| | | | |
|---|---|---|---|
| 2013/0127474 A1* | 5/2013 | Zhang | H04W 52/0206 324/433 |
| 2014/0051446 A1* | 2/2014 | Rose | H04W 36/165 455/436 |
| 2015/0078227 A1* | 3/2015 | Kong | H04W 52/0206 370/311 |

FOREIGN PATENT DOCUMENTS

| | | |
|---|---|---|
| WO | WO 2010027569 A1 | 3/2010 |
| WO | WO 2010078561 A1 | 7/2010 |
| WO | WO 2010123417 A1 | 10/2010 |

OTHER PUBLICATIONS

Mitsubishi Electric: Dynamic Setup of HNBs for Energy Savings and Interference Reduction, 3GPP Draft; R3-081949; 3$^{rd}$ Generation Partnership Project (3GPP), Mobile Competence Centre; Aug. 13, 2008.

* cited by examiner

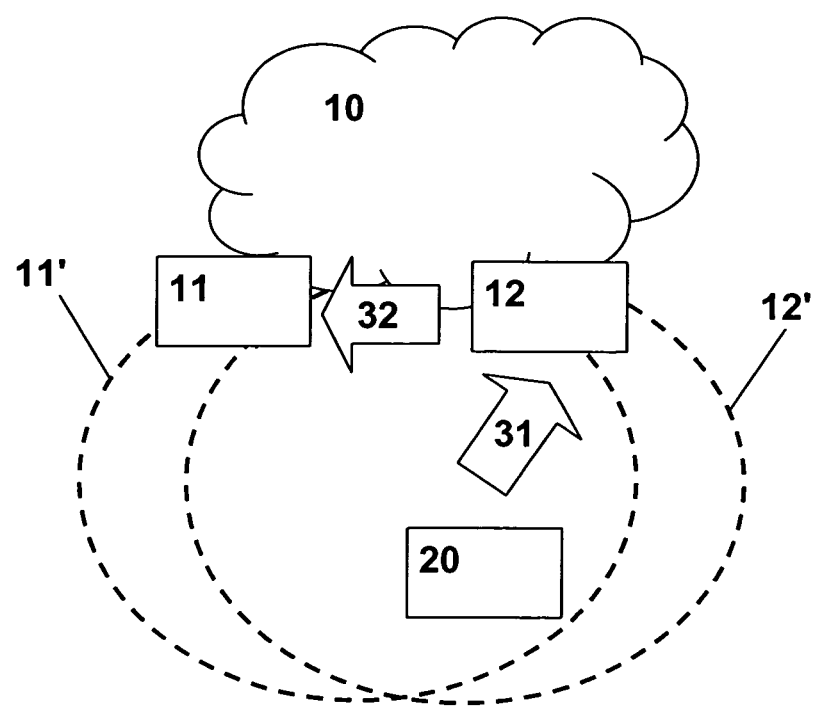

METHOD FOR CONTROLLING THE ACTIVITY OF A BASE STATION ENTITY OF A FIRST TYPE IN A MOBILE COMMUNICATION NETWORK

CROSS-REFERENCE TO RELATED APPLICATIONS

This application is a U.S. National Phase application under 35 U.S.C. §371 of International Application No. PCT/EP2012/000047, filed on Jan. 6, 2012, and claims benefit to European Patent Application No. EP 11000088.2, filed on Jan. 7, 2011, and to U.S. Provisional Application No. 61/430,610, filed on Jan. 7, 2011. The International Application was published in English on Jul. 12, 2012 as WO 2012/093093 A1 under PCT Article 21(2).

FIELD

The present invention relates inter alia to a method for controlling the activity of a base station entity of a first type in a mobile communication network.

BACKGROUND

It is known in the field of mobile communication systems, including mobile communication networks and mobile devices, that mobile devices can enter a so-called sleep mode with a reduced power consumption. This enables a prolonged time of usage of the mobile device between two successive battery charging processes.

Especially during periods of low usage of the mobile communication network, the situation exists that base station entities are not used at all, i.e. in at least one network cell or some network cells of the typically cellular mobile communication network, there are no mobile devices present at all that request a communication service from the mobile communication network. It would be desirable to reduce the power consumption of especially those base stations or base station entities in periods of low usage of the mobile communication network. Presently, it is possible to monitor the network usage, e.g. by means of an operations and maintenance/management center (OMC) controlling the mobile communication network. In case that low network usage (or absence of network usage) is detected in one network cell or in a plurality of network cells, it would be possible to switch off at least partly the corresponding network equipment such as base station entities or other network components.

However, such a centrally managed approach in monitoring the network activity and controlling the powering (off and on) of the network equipment (e.g., by the operations and maintenance/management center) would normally lead to relatively long switching intervals or to a time lag especially with regard to the reactivation of the network components, i.e. after a period of reduced activity. Therefore, it is difficult or impossible to provide a dynamic reaction (i.e. a comparably quick change in the presence of network services after a period of (locally) reduced activity) to low usage situations of the mobile communication network. The existence of comparably long activation time constants for powering on network components to provide certain services of the mobile communication network on the one hand either means that a powering off (during low usage situations) is not realized at all or on the other hand that a powering off implies a reduction in the service level of the mobile communication network (e.g. such that only GERAN (Global System of Mobile Communication (GSM)/EDGE radio access network) functionalities are present and no (or only reduced) third (3G) or fourth (4G) generation services, such as Universal Mobile Telecommunication System (UMTS) or Long Term Evolution (LTE) services, are available during powering off periods due to the fact that locally 3G/4G network components and associated functionality is powered off). Especially, it is usually not possible to quickly activate a base station entity of a Universal Mobile Telecommunication System (UMTS) network or of a Long Term Evolution (LTE) (advanced) network when a mobile device establishes a Packet Switched (PS) connection in a GERAN network in geographical vicinity.

SUMMARY

In an embodiment, the present invention provides a method for controlling the activity of a base station entity of a first type in a mobile communication network via a mobile device having a communication link to a base station entity of a second type. The base station entity of the second type corresponds to a first Radio Access Technology (RAT) and the base station entity of the first type corresponding to a second RAT. The base station entity of the first type is able to be operated in at least a first and a second operational mode. The first operational mode corresponds to the base station entity of the first type transmitting radio frequency signals such that a control channel is received in a radio coverage area of the base station entity of the first type by the mobile device. The second operational mode corresponds to the base station entity of the first type not providing the control channel in the radio coverage area of the base station entity of the first type. The method includes: sending, by the mobile device, a connection request to the base station entity of the second type, the connection request being related to a request of the mobile device to have a communication link with the base station entity of the first type while the base station entity of the first type is in its second operational mode; and activating the first operational mode of the base station entity of the first type and establishing the communication link between the mobile device and the base station entity of the first type established. A plurality of base station entities of the first type correspond to a further radio coverage area of the base station entity of the second type. The choice of which base station entity of the first type is to be activated in the activating step is dependent on at least one out of the following: a detected position of the mobile device within the further radio coverage area of the base station entity of the second type; a detected speed and/or direction of motion of the mobile device within the further radio coverage area of the base station entity of the second type; the geographical or infrastructural situation within the further radio coverage area of the base station entity of the second type; and the mobile device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates a mobile communication network comprising base station entities of a first and second type and a mobile device.

DETAILED DESCRIPTION

In an embodiment, the present invention provides a method for controlling the activity of a base station entity in a mobile communication network such that on the one hand it is possible to reduce power consumption of the base station entity where (and when) network functionality is not required due to low usage of the network and in the same time to provide the possibility to quickly request network functionality in case that a mobile device requests such a functionality. This is especially advantageous in case that a mobile communication network comprises both, components of a first Radio Access Technology (RAT) (such as a GSM/EDGE mobile communication network) that is available permanently and components of a second Radio Access Technology (RAT) (such as a UMTS or LTE or LTE Advanced mobile communication network) that is preferably not permanently available (in each and every geographical area) in order to reduce the power consumption of at least part of its related network components such as base station entities.

In an embodiment, a method is provided for controlling the activity of a base station entity of a first type in a mobile communication network by means of a mobile device having a communication link to a base station entity of a second type, the base station entity of the second type corresponding to a first Radio Access Technology and the base station entity of the first type corresponding to a second Radio Access Technology, wherein the base station entity of the first type is able to be operated in at least a first and a second operational mode, wherein the first operational mode corresponds to the base station entity of the first type transmitting radio frequency signals such that a control channel is received in a radio coverage area of the base station entity of the first type by the mobile device, wherein the second operational mode corresponds to the base station entity of the first type not providing the control channel in the radio coverage area of the base station entity of the first type, wherein the method comprises the following steps:

in a first step, the mobile device sends a connection request to the base station entity of the second type, the connection request being related to a request of the mobile device to have a communication link with the base station entity of the first type while the base station entity of the first type is in its second operational mode, in a second step, the first operational mode of the base station entity of the first type is activated and the communication link between the mobile device and the base station entity of the first type established.

It is thereby advantageously possible that a base station entity of the first type can be activated in a simple and effective manner such that the network functionalities and services can be provided to a user of the mobile device either instantaneously or at least with only a very short time lag. For example, it is possible according to the present invention
  to power off (i.e. switch to the second operational mode) such base station entities of the first type that are only in idle mode (due to low network usage or absence of network usage) and
  nevertheless to provide a good service quality to such users of the mobile communication network that request a service related to base station entities of the first type that has been powered off.

This leads to an overall reduction of power consumption of the mobile communication network as it is possible to power off certain base station entities of the first type and their auxiliary components such as cooling entities or the like in a more granular manner (both in time and from a geographical perspective).

According to embodiments of the present invention, the base station entities of the first type have a mechanism to be remotely activated and deactivated by other nodes of the mobile communication network such as the base station entities of the second type. To this end, an appropriate communication link (wire-line or wireless) need to be established (or need to be able to be established) between the base station entity of the second type and the base station entity of the first type. For example, this can be a bidirectional communication link between the base station entity of the first type and the base station entity of the second type such that an information regarding the operational mode of the base station entity of the first type is accessible (e.g. by means of a request) to the base station entity of the second type. This communication link between the base station entity of the second type and the base station entity of the first type is either a direct communication link or an indirect communication link, e.g. via the OMC. In case that the base station entity of the first type and the base station entity of the second type are provided as a multi-standard base station entity, such a communication link is not (or only internally) required.

It should be understood that according to embodiments of the present invention, it is also possible—in the second operational mode of the base station entity of the first type—to deactivate or to use a second operational mode for only parts or components of a base station entity, e.g. power amplifiers related to certain transmission channels of the base station entity of the first type.

According to embodiments of the present invention, the connection request (hereinafter also called first reactivation request or service request) of the mobile device to the base station entity of the second type is preferably a regular request or attempt (according the specifications of Third Generation Partnership Project (3GPP) standard Release 10) to obtain a communication service from the base station entity of the second type. The connection request (or service request or (first) reactivation request) can have the form of a request for connection (or attachment) to a Packet Switched (PS) domain of the mobile communication network, which implies that the maximum possible bandwidth is preferred by the mobile device and hence the availability of a higher bandwidth service would be appreciated. It is furthermore preferred that the information accessible (via a database accessible by the mobile communication network) from the knowledge of the IMEI (International Mobile Equipment Identifier) number about the capabilities of the mobile device is used to determine whether a radio connection according to another Radio Access Technology (RAT) than provided by the base station entity of the second type would be useful to the mobile device.

According to an alternative embodiment of the present invention, the reactivation request is a slightly modified regular request or attempt (according the specifications of Third Generation Partnership Project (3GPP) standard Release 10) to obtain a communication service from the base station entity of the second type. In this alternative, the first reactivation request comprises the transmission of an explicit information to the base station entity of the second type indicating that another Radio Access Technology (RAT) than provided by the base station entity of the second type is requested.

In the context of the present invention, it is to be understood that the principle of the invention is also applicable to other wireless technologies than GSM, UMTS, LTE or LTE Advanced, namely to a TETRA mobile communication network (Terrestrial Truked Radio), a satellite communication network, a WiMAX communication network (Worldwide Interoperability for Microwave Access), a WLAN communication network or a cdma2000 mobile communication network.

According to embodiments of the present invention, it is possible that the base station entity of the first type is deactivated to such an extent (especially by not only deactivating a transceiver (or transmission chain) of the base station entity of the first type but also by deactivating a receiver (or reception chain) of the base station entity of the first type) that the mobile device does not even receive any control channel of the base station entity of the first type (in its deactivated second operational mode). This means that the mobile device (at least under the assumption that the mobile device did not enter the radio coverage area of the base station entity of the first type prior to powering off this base station entity (of the first type)) does not know about the existence of this base station entity (of the first type) and of the services potentially offered by this base station entity. Only after a reactivation of the base station entity of the first type, the mobile device knows about the existence of this base station entity (of the first type) and (especially in case that the services offered by this base station entity are requested by the mobile device) a connection is established or an attachment of the mobile device with this base station entity (of the first type) is performed. In any case, the connection setup between the mobile device on the one hand and the base station entity of the first type on the other hand follows existing standardized rules, e.g. of Inter-RAT handover procedures). In particular, it is neither initiated by the base station entity of the second type nor is the base station entity of the second type involved in this connection setup.

Furthermore, in the context of the present invention, the term "base station entity of the first type" or "base station entity of the second type" means an entity providing base station functionality such as

- a BTS (Base Transceiver Station) according to the GSM standard, and/or
- NodeB according to the UMTS standard, and/or
- eNodeB according to the LTE or LTE Advanced standard, and/or
- Relay Node (RN) or Relay Station (RS), and/or
- Access Point according to the WLAN standard and/or
- Base station according to the TETRA standard and/or
- Base station according to the WIMAX standard.

The terms "base station entity of the first type" and "base station entity of the second type" only serve to differentiate the base station functionalities according to (or related to) a second Radio Access Technology (RAT) from the base station functionalities according to (or related to) a first Radio Access Technology (RAT). This does not imply that a base station entity of the first type necessarily needs to be separated from a base station entity of the second type (however such a separation can of course be the case for some base station entities). It is even possible that (e.g. in certain geographic areas) at least parts of a given base station entity of the first type and of a given base station entity of the second type are located together or are even (at least partly) merged in one housing or even that components thereof are shared in common such as antenna devices, power supply devices or the like.

The realization of the present invention is independent from whether a base station entity (of the first or of the second type) is provided as a base station entity having a wire-line backhaul or as a base station entity being a relay base station entity (which is connected via a wireless link according to either the first or the second Radio Access Technology in the same or another frequency band to another network node).

According to embodiments of the present invention, the control channel of the base station entity of the first type that is transmitted by the base station entity of the first type in the first operational mode (such that a control channel is received in a radio coverage area of the base station entity of the first type by the mobile device) and that is not transmitted by the base station entity of the first type in the second operational mode is a physical control channel.

Mobile communication networks, especially public land mobile networks, are often operated such that services of different Radio Access Technologies (RAT) are offered simultaneously and at the same location, and sometimes even by the same operator (i.e. a part of the (overall) mobile communication network comprises a public land mobile network according to a first standard (or first Radio Access Technology), such as a 2G standard, and another part of the (overall) mobile communication network comprises a public land mobile network according to a second standard (or second Radio Access Technology)). Reasons for doing so include backward compatibility requirements, as a certain number of subscribers continue to use legacy mobile devices that are not compatible with a second Radio Access Technology, as well as a geographical coverage of less than 100% for the second Radio Access Technology. For example, in case that in a specific geographical region there is a 2G mobile communication network (such as a GERAN network) and a 3G or 4G mobile communication network (such as a UMTS or LTE network), it is possible according to embodiments of the present invention to power off the 3G/4G network components (i.e. the base station entities of the first type or parts of base station entities of the first type related to the 3G/4G services are in the second operational mode) and to provide a basic service level of the mobile communication network in the form of 2G connectivity. According to embodiments of the present invention, a mobile device that seeks to have a 3G/4G service from the mobile communication network transmits a connection request to the base station entity of the second type, the connection request being related to a request of the mobile device to have a communication link with the base station entity of the first type while the base station entity of the first type is in its second operational mode. Typically by means of a further reactivation request (hereinafter also called second reactivation request) (sent from the base station entity of the second type to the base station entity of the first type), the base station entity of the first type is activated or reactivated and a requested 3G or 4G service of the mobile communication network can be provided to the user of the mobile device using the appropriate (and activated) base station entity of the first type.

A reduced overall power consumption of the base station entity or of the plurality of base station entities of the mobile communication network is desirable as such but a reduced power consumption that is possible according to embodiments of the present invention enables the use and deployment of mobile communication networks even in situation without the possibility to (economically) provide an electric grid. Furthermore, it is advantageous according to embodiments of the present invention that the emission of radiofrequency radiation (by base station entities) is reduced in situations or during time intervals where such an emission is not beneficial at all.

According to embodiments of the present invention, the base station entity of the first type, in its second operational mode, does neither provide control channels nor pilot channels, i.e. both the emission of the control channel or control channels and the emission of the pilot channel or pilot channels is powered off. It is preferred that the control channel is at least one out of the following:

a Broadcast Control Channel (BCCH),
a pilot channel,
a physical synchronization channel (SCH)
a paging indicator channel (PICH).

A Broadcast Control Channel is present in mobile communication network according to the Global System of Mobile Communication (GSM) standard, according to the EDGE standard, according to the Universal Mobile Telecommunication System (UMTS) standard, according to the Long Term Evolution (LTE) standard, and according to the Long Term Evolution (LTE) Advanced standard. The Broadcast Control Channel is a point to multipoint, unidirectional (downlink) channel. The Broadcast Control Channel carries a repeating pattern of system information messages that describe the identity, configuration and available features of the base station entity of the first type.

According to embodiments of the present invention, by means of transmitting the connection request to the base station entity of the second type, the mobile device tries to activate the base station entity of the first type (in its second operational mode) such that as a result of the activation (or reactivation) of the base station entity of the first type the control channel (or Broadcast Control Channel) is emitted by the base station entity of the first type. In a preferred embodiment of the present invention, the mobile device actively transmits the information to the base station entity of the second type to provide a higher service level (available only via 3G/4G network components, i.e. the base station entity of the first type).

It is preferred that after completion of the second step, an inter-Radio Access Technology (RAT) handover procedure is initiated by the mobile device from the base station entity of the second type to the base station entity of the first type.

Thereby, it is advantageously possible that a higher service level (i.e. the services of the second Radio Access Technology) can be provided to the user of the mobile device in a comparably timely manner. The mobile device is served by the base station entity of the first type in the corresponding radio coverage area until either the connection is terminated (i.e. e.g. the mobile device returns to the idle mode) or the mobile device has moved to another cell of the mobile communication network such as a neighbouring cell and associated base station entity of the first type.

It is furthermore preferred that a plurality of base station entities of the first type correspond to a further radio coverage area of the base station entity of the second type, wherein the choice which base station entity of the first type is to be activated in the second step is dependent on at least one out of the following:

a detected position of the mobile device within the further radio coverage area of the base station entity of the second type,
a detected speed and/or direction of motion of the mobile device within the further radio coverage area of the base station entity of the second type,
the geographical or infrastructural situation within the further radio coverage area of the base station entity of the second type,
the mobile device.

Thereby, it is easily possible to still further reduce the overall power consumption of the mobile communication network and its components and nodes as only one specific base station entity of the first type or only a subset of specific base station entities of the first type is/are activated for providing the requested services to the mobile device in case that the radio coverage area of the base station entity of the second type comprises a plurality of radio coverage areas (and corresponding base station entities of the first type) of the first Radio Access Technology. For example, it is preferred that the base station entity of the second type has an information or at least an indication about the location of the mobile device within the further radio coverage area of the base station entity of the second type. The choice of which one (or which subset) of the plurality of base station entities of the first type is/are activated by the base station entity of the second type therefore advantageously depends on the information or indication of the location of the mobile device within the further radio coverage area of the base station entity of the second type. In order to avoid the deterioration of the service level to the mobile device in case that the (moving) mobile device arrives at or approaches the limit of the radio coverage area of the base station entity of the first type currently connected to (after its reactivation from the second operational mode), it is possible and preferred to also activate the base station entities of the first type depending on the speed and/or the direction of motion of the mobile device. Furthermore, the geographical or infrastructural situation of the local environment is taken into consideration in choosing the base station entity or entities of the first type to be activated: if for example a motorway goes across the further radio coverage area of the base station entity of the second type and the motorway is covered by the radio coverage areas of two (out of three or more) base station entities of the first type, then it might be advantageous (for providing the best service level regarding the second Radio Access Technology while still powering off as much base station entities of the first type as possible) to activate the two base station entities of the first type along the motorway as the probability of increase speeds of motion of mobile devices is highest for these two base station entities of the first type (or their respective radio coverage area).

Furthermore, it is also possible to modify the pattern of activation of base station entities of the first type dependent on which mobile device requests the service of the base station entity of the first type. For example, the presence of a specific mobile device having special prerogatives (such as police, fire department, home security or the like) could result in a more general activation pattern of different base station entity of the first type.

Furthermore, it is also preferred that a further base station entity of the first type is activated in dependency of at least one out of the following:

a detected position of the mobile device within the radio coverage area of the base station entity of the first type,
a detected speed and/or direction of motion of the mobile device within the radio coverage area of the base station entity of the first type,
the geographical or infrastructural situation within the radio coverage area of the base station entity of the first type,
the mobile device.

Thereby, it is advantageously possible to flexibly activate other base station entities of the first type in order to provide (or maintain) a service level to the mobile device that is enhanced compared to the service level of the base station entities of the second type (i.e. the first Radio Access Technology).

In case that a mobile device communicates with an activated base station entity of the first type (i.e. in its first operational mode) and the mobile device reaches or approaches the limit of the radio coverage area of the base station entity of the first type, then the service quality to the mobile device would be enhanced if the neighboring (or further) base station entity of the first type would already be activated when the handover occurs. This means that (due to the fact that there is a certain time lag after the initiation of the activation of the base station entity of the first type and the availability of the respective service to a mobile device) an activation of the further base station entity of the first type in advance to the anticipated handover is desirable. Such an activation of neighboring base station entities of the first type in advance might be provided by the present invention according to different pattern:

for example all neighboring base station entities of the first type might be activated (by precaution) in case that a base station entity of the first type is serving a mobile device, alternatively, only such neighboring base station entities of the first type (or only one such neighboring base station entity of the first type) might be activated to which the handover of the mobile device (being the only served mobile device) is most likely to occur (e.g. base on an estimation of the location of the mobile device (for example based on a timing advance information) within the radio coverage area of the serving base station entity of the first type). The activation of the other (neighboring) base station entities of the first type is preferably initiated by the base station entity of the first type serving the mobile device.

The first alternative (of activating all (or a predefined subset or all) neighboring base station entities of the first type of a serving base station entity of the first type) might be preferable in case of areas having fast transportation infrastructure such as motorway or railway lines, whereas the second alternative (of activating only such neighboring base station entities of the first type (or only one such neighboring base station entity of the first type) to which the handover of the mobile device (being the only served mobile device) is most likely to occur) might be preferred in residential areas where mobile device are normally used in a stationary manner or quasi-stationary or at least with comparably low speeds of motion. The first and second alternative might also be combined such that a subset of the neighboring base station entities of the first type (of a serving base station entity of the first type) are automatically activated (as these base station entities of the first type cover, e.g., a motorway or a railway line) and other neighboring base station entities of the first type (of the same service base station entity of the first type) are only activated upon an approach of the mobile device to the radio coverage areas of these base station entities of the first type.

According to embodiments of the present invention, not only the activation of a base station entity of the first type can be controlled advantageously but also the deactivation of a base station entity of the first type. For example, in case that a specific mobile device is the only mobile device to request a service of a base station entity of the first type at a given point in time, and this base station entity of the first type has handed over the connection with the specific mobile device to, e.g., a neighbouring cell and associated base station entity of the first type, then the base station entity of the first type in question can safely by deactivated, i.e. its operational mode changed (from the first operational mode) to the second operational mode (without reducing the service level of known mobile devices present in the relevant geographical area).

It is possible that the operation and maintenance/management center of the mobile communication network only allows the deactivation of base station entities of the first type during certain time windows within a day or within a week such that during times of typically high network usage, no time lag (or a reduced service level) is realised due to powering of certain base station entities of the first type.

Furthermore, it is possible and preferred that the connection request comprises the indication of a first service requested by the mobile device or the indication of a second service requested by the mobile device, wherein the base station entity of the first type or a base station entity of a third type is activated in a manner dependent on whether the first service or the second service is requested by the mobile device.

Thereby, it is advantageously possible that in case that besides the base station entities of the first type not only base station entities of the second type exist but also base station entities of a third type (namely providing a service according to still another Radio Access Technology (other than the second and first Radio Access Technology)), a targeted activation of the requested kind of base station entity (of the first or third type) is possible. This is, e.g., advantageous in case that besides a 2G coverage of the mobile communication network (via the base station entities of the second type), a 3G coverage via the base station entities of the first type and a 4G coverage via the base station entities of the third type is provided and the mobile device explicitly request a connection to either a 3G service or a 4G service. The information which service is requested by the mobile device might be transmitted (using the connection request or independent thereof) to the base station entity of the second type by means of a transmission of information regarding the capabilities of the mobile device.

Furthermore, it is possible and preferred that a dynamic adaptation of the Broadcast Control Channel is applied prior to an inter-RAT handover (to the base station entity of the first type) during the activation of the base station entity of the first type. Conventionally, inter-RAT handovers can result in a short interruption or deterioration of the service level. In order to reduce or avoid such a deterioration in the service level, it is possible that the base station entity of the second type emits information (especially on the Broadcast Control Channel) used by the mobile device to a gain access more quickly to the base station entity of the first type after its reactivation is completed. It should be noted that the base station entities of the second type should advantageously not (permanently) emit information regarding base station entities of the first type while these are in their second operational mode (i.e. "sleeping") (in order to reduce unnecessary attempts by mobile devices to perform inter-RAT handovers), but as soon as a base station entity of the first type is in transition from its second operational mode to its first operational mode such a dynamic modification of the Broadcast Control Channel is preferred according to the present invention.

Embodiments of the present invention also relate to a base station entity of a first type in a mobile communication network, the base station entity of the first type being able for being controlled by means of a mobile device having a communication link to a base station entity of a second type, the base station entity of the second type corresponding to a first Radio Access Technology and the base station entity of the first type corresponding to a second Radio Access Technology, wherein the base station entity of the first type is able to be operated in at least a first and a second operational mode, wherein the first operational mode corresponds to the base station entity of the first type transmitting radio frequency signals such that a control channel is received in a radio coverage area of the base station entity of the first type by the mobile device, wherein the second operational mode corresponds to the base station entity of the first type not providing the control channel in the radio coverage area of the base station entity of the first type, wherein the base station entity of the first type is provided such that a connection request is sent from the mobile device to the base station entity of the second type, the connection request being related to a request of the mobile device to have a communication link with the base station entity of the first type while the base station entity of the first type is in its second operational mode, wherein as a consequence, the first operational mode of the base station entity of the first type is activated and the communication link between the mobile device and the base station entity of the first type established.

Embodiments of the present invention also relate to a base station entity of a second type, for controlling the activity of a base station entity of a first type in a mobile communication network by means of a mobile device having a communication link to the base station entity of a second type, the base station entity of the second type corresponding to a first Radio Access Technology and the base station entity of the first type corresponding to a second Radio Access Technology, wherein the base station entity of the first type is able to be operated in at least a first and a second operational mode, wherein the first operational mode corresponds to the base station entity of the first type transmitting radio frequency signals such that a control channel is received in a radio coverage area of the base station entity of the first type by the mobile device, wherein the second operational mode corresponds to the base station entity of the first type not providing the control channel in the radio coverage area of the base station entity of the first type, wherein the base station entity of the second type is provided such that a connection request is received from the mobile device, the connection request being related to a request of the mobile device to have a communication link with the base station entity of the first type while the base station entity of the first type is in its second operational mode, wherein as a consequence, the first operational mode of the base station entity of the first type is activated and the communication link between the mobile device and the base station entity of the first type established.

Furthermore, embodiments of the present invention relate to a mobile device for controlling the activity of a base station entity of a first type in a mobile communication network by means of the mobile device having a communication link to a base station entity of a second type, the base station entity of the second type corresponding to a first Radio Access Technology and the base station entity of the first type corresponding to a second Radio Access Technology, wherein the base station entity of the first type is able to be operated in at least a first and a second operational mode, wherein the first operational mode corresponds to the base station entity of the first type transmitting radio frequency signals such that a control channel is received in a radio coverage area of the base station entity of the first type by the mobile device, wherein the second operational mode corresponds to the base station entity of the first type not providing the control channel in the radio coverage area of the base station entity of the first type, wherein the mobile device is provided such that a connection request is sent from the mobile device to the base station entity of the second type, the connection request being related to a request of the mobile device to have a communication link with the base station entity of the first type while the base station entity of the first type is in its second operational mode, wherein as a consequence, the first operational mode of the base station entity of the first type is activated and the communication link between the mobile device and the base station entity of the first type established.

Furthermore, embodiments of the present invention relate to a mobile communication network for controlling the activity of a base station entity of a first type by means of the mobile device having a communication link to a base station entity of a second type, the base station entity of the second type corresponding to a first Radio Access Technology and the base station entity of the first type corresponding to a second Radio Access Technology, wherein the base station entity of the first type is able to be operated in at least a first and a second operational mode, wherein the first operational mode corresponds to the base station entity of the first type transmitting radio frequency signals such that a control channel is received in a radio coverage area of the base station entity of the first type by the mobile device, wherein the second operational mode corresponds to the base station entity of the first type not providing the control channel in the radio coverage area of the base station entity of the first type, wherein the mobile communication network is provided such that a connection request is received by the base station entity of the first type from the mobile device to, the connection request being related to a request of the mobile device to have a communication link with the base station entity of the first type while the base station entity of the first type is in its second operational mode, wherein as a consequence, the first operational mode of the base station entity of the first type is activated and the communication link between the mobile device and the base station entity of the first type established.

Furthermore, embodiments of the present invention relate to a program comprising a computer readable program code for controlling a base station entity of the second type for controlling the activity of a base station entity of a first type in a mobile communication network by means of the mobile device having a communication link to a base station entity of a second type, the base station entity of the second type corresponding to a first Radio Access Technology and the base station entity of the first type corresponding to a second Radio Access Technology, wherein the base station entity of the first type is able to be operated in at least a first and a second operational mode, wherein the first operational mode corresponds to the base station entity of the first type transmitting radio frequency signals such that a control channel is received in a radio coverage area of the base station entity of the first type by the mobile device, wherein the second operational mode corresponds to the base station entity of the first type not providing the control channel in the radio coverage area of the base station entity of the first type, wherein the mobile device is provided such that a connection request is sent from the mobile device to the base station entity of the second type, the connection request being related to a request of the mobile device to have a communication link with the base station entity of the first type while the base station entity of the first type is in its second operational mode, wherein as a consequence, the first operational mode of the base station entity of the first type is activated and the communication link between the mobile device and the base station entity of the first type established.

Embodiments of the present invention also relate to computer program product comprising an inventive program.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

In FIG. 1, a mobile communication network 10 is schematically shown having a base station entity of a first type 11 and a base station entity of a second type 12. The base station entity of the first type 11 has a radio coverage area 11' and a mobile device 20 is depicted being located within the radio coverage area 11' of the base station entity of the first type 11. The base station entity of the second type 12 has a further radio coverage area 12' and the mobile device 20 is depicted being located also within the further radio coverage area 12' of the base station entity of the second type 12. The base station entity of the second type 12 corresponds to a first Radio Access Technology (e.g. the services of a GERAN network) and the base station entity of the first type corresponds to a second Radio Access Technology (e.g. the services of a 3G or 4G network).

The base station entity of the first type 11 is able to be operated in at least a first operational mode and a second operational mode. The first operational mode corresponds to the base station entity of the first type 11 transmitting radio frequency signals such that a control channel is received in the radio coverage area 11' of the base station entity of the first type 11 by the mobile device 20. This corresponds to the normal (and standardized) behavior and situation of both the mobile device 20 and the base station entity of the first type 11. According to embodiments of the present invention, the base station entity of the first type 11 is able to be operated in the second operational mode which corresponds to the base station entity of the first type 11 being at least partly switched off. This means that at least during power saving time intervals the control channel is not provided in the radio coverage area 11' of the base station entity of the first type 11. According to the normal (standardized) behavior of the mobile device 20 and the base station entity of the first type 11 and of the second type 12 (or the mobile communication network 10), the mobile device 20 interprets the situation the powered off base station entity of the first type 11 as a situation where a specific service provided by the base station entity of the first type 11 is not available and an attachment, e.g. to a high bitrate Packet Switched (PS) service, is not possible. Hence the base station entity of the second type 12 is contacted by the mobile device 20 and the base station entity of the second type 12 provides the services according to the first Radio Access Technology. In case that by means of a connection request 31 (either implicitly or explicitly), the mobile device 20 requests from the base station entity of the second type 12 a service that only the base station entity of the first type 11 can provide, the base station entity of the first type 11 is activated, especially by means of a further reactivation request 32.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention claimed is:

1. A method for controlling the activity of a base station entity of a first type in a mobile communication network via a mobile device having a communication link to a base station entity of a second type, the base station entity of the second type configured with a first Radio Access Technology (RAT) and the base station entity of the first type configured with a second RAT, the first RAT providing the mobile device with only a first type of service and the second RAT providing the mobile device with only a second type of service different than the first type of service, wherein the base station entity of the first type is able to be operated in at least a first and a second operational mode, wherein the first operational mode corresponds to the base station entity of the first type transmitting radio frequency signals such that a control channel corresponding to the second RAT is received in a radio coverage area of the base station entity of the first type by the mobile device, wherein the second operational mode corresponds to the base station entity of the first type not providing the control channel corresponding to the second RAT in the radio coverage area of the base station entity of the first type for the mobile device such that the control channel corresponding to the second RAT is not received in the radio coverage area of the base station entity of the first type by the mobile device, wherein the method comprises:

sending, by the mobile device, a connection request to the base station entity of the second type, the connection request being related to a request of the mobile device to have a communication link with the base station entity of the first type, the sending being while the base station entity of the first type is in its second operational mode; and activating the first operational mode of the base station entity of the first type and establishing the communication link between the mobile device and the base station entity of the first type;

wherein a plurality of base station entities of the first type correspond to a radio coverage area of the base station entity of the second type, and wherein the choice of the base station entity of the first type is to be activated in the activating step is dependent on at least one out of the following:

a detected position of the mobile device within the radio coverage area of the base station entity of the second type; a detected speed and/or direction of motion of the mobile device within the radio coverage area of the base station entity of the second type; a geographical or infrastructural situation within the radio coverage area of the base station entity of the second type; and the mobile device;

wherein during the second operational mode, the mobile device does not know of the existence of the base station entity of the first type and is unable to receive the second type of service.

2. The method according to claim 1, wherein the control channel is at least one out of the following: a Broadcast Control Channel (BCCH), a pilot channel, a physical synchronization channel (SCH), and a paging indicator channel (PICH).

3. The method according to claim 1, wherein the base station entity of the first type is activated or reactivated via a further reactivation request sent from the base station entity of the second type to the base station entity of the first type.

4. The method according to claim 1, wherein after completion of the activating step, an inter-RAT handover procedure is initiated by the mobile device from the base station entity of the second type to the base station entity of the first type.

5. The method according to claim 1, wherein a further base station entity of the first type is activated based on at least one out of the following:

a detected position of the mobile device within the radio coverage area of the base station entity of the first type;

a detected speed and/or direction of motion of the mobile device within the radio coverage area of the base station entity of the first type;

the geographical or infrastructural situation within the radio coverage area of the base station entity of the first type; and the mobile device.

6. The method according to claim 1, wherein the connection request comprises the indication of a first service requested by the mobile device or the indication of a second service requested by the mobile device, wherein the base station entity of the first type or a base station entity of a third type is activated based on whether the first service or the second service is requested by the mobile device.

7. A base station entity in a mobile communication network, wherein the mobile communication network comprises a base station as a base station entity of a first type, the base station entity of the first type being able to be controlled via a mobile device having a communication link to a base station entity of a second type, the base station entity of the second type configured with a first Radio Access Technology (RAT) and the base station entity of the first type configured with a second RAT, the first RAT providing the mobile device with only a first type of service and the second RAT providing the mobile device with only a second type of service different than the first type of service, wherein the base station entity of the first type is able to be operated in at least a first and a second operational mode, wherein the first operational mode corresponds to the base station entity of the first type transmitting radio frequency signals such that a control channel corresponding to the second RAT is received in a radio coverage area of the base station entity of the first type by the mobile device, wherein the second operational mode corresponds to the base station entity of the first type not providing the control channel corresponding to the second RAT in the radio coverage area of the base station entity of the first type for the mobile device such that the control channel corresponding to the second RAT is not received in the radio coverage area of the base station entity of the first type by the mobile device, wherein the base station entity of the first type is provided such that a connection request is sent from the mobile device to the base station entity of the second type, the connection request being related to a request of the mobile device to have a communication link with the base station entity of the first type, the connection request being sent while the base station entity of the first type is in its second operational mode, wherein in response thereto, the first operational mode of the base station entity of the first type is activated and the communication link between the mobile device and the base station entity of the first type is established;

wherein during the second operational mode, the mobile device does not know of the existence of the base station entity of the first type and is unable to receive the second type of service; and wherein a plurality of base station entities of the first type correspond to a radio coverage area of the base station entity of the second type, and wherein the choice of the base station entity of the first type is to be activated is dependent on at least one out of the following:

a detected position of the mobile device within the radio coverage area of the base station entity of the second type; a detected speed and/or direction of motion of the mobile device within the radio coverage area of the base station entity of the second type; a geographical or infrastructural situation within the radio coverage area of the base station entity of the second type; and the mobile device.

8. The base station entity of claim 7, wherein after completion of the activation, an inter-RAT handover procedure is initiated by the mobile device from the base station entity of the second type to the base station entity of the first type.

9. A base station entity in a mobile communication network, wherein the mobile communication network comprises the base station entity as a base station entity of a second type for controlling the activity of a base station entity of a first type in the mobile communication network via a mobile device having a communication link to the base station entity of the second type, the base station entity of the second type configured with a first Radio Access Technology (RAT) and the base station entity of the first type configured with a second RAT, the first RAT providing the mobile device with only a first type of service and the second RAT providing the mobile device with only a second type of service different than the first type of service,
wherein the base station entity of the first type is able to be operated in at least a first and a second operational mode, wherein the first operational mode corresponds to the base station entity of the first type transmitting radio frequency signals such that a control channel corresponding to the second RAT is received in a radio coverage area of the base station entity of the first type by the mobile device, wherein the second operational mode corresponds to the base station entity of the first type not providing the control channel corresponding to the second RAT in the radio coverage area of the base station entity of the first type for the mobile device such that the control channel corresponding to the second RAT is not received in the radio coverage area of the base station entity of the first type by the mobile device,
wherein the base station entity of the second type is provided such that a connection request is received from the mobile device, the connection request being related to a request of the mobile device to have a communication link with the base station entity of the first type, the connection request being received while the base station entity of the first type is in its second operational mode, wherein in response thereto, the first operational mode of the base station entity of the first type is activated and the communication link between the mobile device and the base station entity of the first type is established;
wherein during the second operational mode, the mobile device does not know of the existence of the base station entity of the first type and is unable to receive the second type of service; and
wherein a plurality of base station entities of the first type correspond to a radio coverage area of the base station entity of the second type, and wherein the choice of the base station entity of the first type is to be activated is dependent on at least one out of the following:
a detected position of the mobile device within the radio coverage area of the base station entity of the second type; a detected speed and/or direction of motion of the mobile device within the radio coverage area of the base station entity of the second type; a geographical or infrastructural situation within the radio coverage area of the base station entity of the second type; and the mobile device.

10. The base station entity of claim 9, wherein after completion of the activation, an inter-RAT handover procedure is initiated by the mobile device from the base station entity of the second type to the base station entity of the first type.

11. A mobile device for controlling the activity of a base station entity of a first type in a mobile communication network, the mobile device having a communication link to a base station entity of a second type, the base station entity of the second type configured with a first Radio Access Technology (RAT) and the base station entity of the first type configured with a second RAT, the first RAT providing the mobile device with only a first type of service and the second RAT providing the mobile device with only a second type of service different than the first type of service,
wherein the base station entity of the first type is able to be operated in at least a first and a second operational mode, wherein the first operational mode corresponds to the base station entity of the first type transmitting radio frequency signals such that a control channel corresponding to the second RAT is received in a radio coverage area of the base station entity of the first type by the mobile device, wherein the second operational mode corresponds to the base station entity of the first type not providing the control channel corresponding to the second RAT in the radio coverage area of the base station entity of the first type for the mobile device such that the control channel corresponding to the second RAT is not received in the radio coverage area of the base station entity of the first type by the mobile device,
wherein the mobile device is provided such that a connection request is sent from the mobile device to the base station entity of the second type, the connection request being related to a request of the mobile device to have a communication link with the base station entity of the first type, the connection request being sent while the base station entity of the first type is in its second operational mode, wherein in response thereto, the first operational mode of the base station entity of the first type is activated and the communication link between the mobile device and the base station entity of the first type is established;
wherein during the second operational mode, the mobile device does not know of the existence of the base station entity of the first type and is unable to receive the second type of service; and
wherein a plurality of base station entities of the first type correspond to a radio coverage area of the base station entity of the second type, and wherein the choice of the base station entity of the first type is to be activated is dependent on at least one out of the following:
a detected position of the mobile device within the radio coverage area of the base station entity of the second type; a detected speed and/or direction of motion of the mobile device within the radio coverage area of the base station entity of the second type; a geographical or infrastructural situation within the radio coverage area of the base station entity of the second type; and the mobile device.

12. A mobile communication network for controlling the activity of a base station entity of a first type via a mobile device having a communication link to a base station entity of a second type, the base station entity of the second type configured with a first Radio Access Technology (RAT) and the base station entity of the first type configured with a second RAT, the first RAT providing the mobile device with only a first type of service and the second RAT providing the mobile device with only a second type of service different than the first type of service,
wherein the base station entity of the first type is able to be operated in at least a first and a second operational mode, wherein the first operational mode corresponds to the base station entity of the first type transmitting radio frequency signals such that a control channel corresponding to the second RAT is received in a radio coverage area of the base station entity of the first type by the mobile device, wherein the second operational mode corresponds to the base station entity of the first type not providing the control channel corresponding to the second RAT in the radio coverage area of the base station entity of the first type for the mobile device such that the control channel corresponding to the second RAT is not received in the radio coverage area of the base station entity of the first type by the mobile device,
wherein the mobile communication network is provided such that a connection request is received by the base station entity of the first type from the mobile device to, the connection request being related to a request of the mobile device to have a communication link with the base station entity of the first type, the connection request being received while the base station entity of the first type is in its second operational mode, wherein in response thereto, the first operational mode of the base station entity of the first type is activated and the communication link between the mobile device and the base station entity of the first type is established;

wherein during the second operational mode, the mobile device does not know of the existence of the base station entity of the first type and is unable to receive the second type of service; and wherein a plurality of base station entities of the first type correspond to a radio coverage area of the base station entity of the second type, and wherein the choice of the base station entity of the first type is to be activated is dependent on at least one out of the following:

a detected position of the mobile device within the radio coverage area of the base station entity of the second type; a detected speed and/or direction of motion of the mobile device within the radio coverage area of the base station entity of the second type; a geographical or infrastructural situation within the radio coverage area of the base station entity of the second type; and the mobile device.

13. The mobile communication network of claim 12, wherein after completion of the activation, an inter-RAT handover procedure is initiated by the mobile device from the base station entity of the second type to the base station entity of the first type.

14. A non-transitory computer-readable medium having processor-executable instructions stored thereon for controlling the activity of a base station entity of a first type in a mobile communication network via a mobile device having a communication link to a base station entity of a second type, the base station entity of the second type configured with a first Radio Access Technology (RAT) and the base station entity of the first type configured with a second RAT, the first RAT providing the mobile device with only a first type of service and the second RAT providing the mobile device with only a second type of service different than the first type of service, wherein the base station entity of the first type is able to be operated in at least a first and a second operational mode, wherein the first operational mode corresponds to the base station entity of the first type transmitting radio frequency signals such that a control channel corresponding to the second RAT is received in a radio coverage area of the base station entity of the first type by the mobile device, wherein the second operational mode corresponds to the base station entity of the first type not providing the control channel corresponding to the second RAT in the radio coverage area of the base station entity of the first type for the mobile device such that the control channel corresponding to the second RAT is not received in the radio coverage area of the base station entity of the first type by the mobile device, wherein the processor-executable instructions, when executed by a processor, causing the following steps to be performed:

receiving a connection request, the connection request being related to a request of the mobile device to have a communication link with the base station entity of the first type, the receiving being while the base station entity of the first type is in its second operational mode; and activating the first operational mode of the base station entity of the first type and establishing the communication link between the mobile device and the base station entity of the first type;

wherein during the second operational mode, the mobile device does not know of the existence of the base station entity of the first type and is unable to receive the second type of service; and wherein a plurality of base station entities of the first type correspond to a radio coverage area of the base station entity of the second type, and wherein the choice of the base station entity of the first type is to be activated is dependent on at least one out of the following:

a detected position of the mobile device within the radio coverage area of the base station entity of the second type; a detected speed and/or direction of motion of the mobile device within the radio coverage area of the base station entity of the second type; a geographical or infrastructural situation within the radio coverage area of the base station entity of the second type; and the mobile device.

* * * * *